United States Patent [19]

Vezinet et al.

[11] Patent Number: 5,721,478
[45] Date of Patent: Feb. 24, 1998

[54] PROCESS AND DEVICE FOR SUPPLYING A POLYPHASE ELECTRIC MOTOR DURING STARTUP

[75] Inventors: Marc Vezinet, Montgeron; Serge Mourier, Neuilly sur Marne, both of France

[73] Assignee: L'Air Liquide, Societe Anonyme pour l'Etude et l'Exploitation des Procedes Georges Claude, Paris Cedex, France

[21] Appl. No.: 412,304

[22] Filed: Mar. 29, 1995

[30] Foreign Application Priority Data

Apr. 15, 1994 [FR] France ............................. 94 04490

[51] Int. Cl.$^6$ ............................................. H02P 1/26
[52] U.S. Cl. ........................... 318/780; 318/431; 323/238
[58] Field of Search .................................. 318/780, 431, 318/718, 711, 719, 799, 254; 361/33, 92, 154; 323/237, 238, 282, 321

[56] References Cited

U.S. PATENT DOCUMENTS

| | | | |
|---|---|---|---|
| 4,320,328 | 3/1982 | Rudolph, Jr. ........................... | 318/431 |
| 4,384,247 | 5/1983 | Stewart .................................. | 323/256 |
| 4,438,383 | 3/1984 | Etheridge ............................... | 318/799 |
| 4,939,441 | 7/1990 | Dhyanchand .......................... | 318/718 |

FOREIGN PATENT DOCUMENTS

| | | |
|---|---|---|
| 37 39 047 | 6/1988 | Germany. |
| 59-021298 | 2/1984 | Japan. |
| 3 143 281 | 6/1991 | Japan. |

OTHER PUBLICATIONS

H. Illmer, "Die elektrische Austrustung der Triebzuge Baureihe 2300 mit Drehstromantriebstechnik fur die Portugiesische Staatsbahn", *Elektrische Bahnen*, vol. 90, No. 4, Apr. 1992, Munchen, pp. 130–136.

*Primary Examiner*—John W. Cabeca
*Attorney, Agent, or Firm*—Young & Thompson

[57] ABSTRACT

A motor is supplied with electricity across a transformer (T) which outputs on a busbar (J) which is connected to the motor (M) and to other electrical energy consuming devices, the motor by itself consuming an active power greater than or equal to 20% of the available electric power. During at least a part of the starting period of the motor, the motor is supplied with reduced voltages taken on intermediate taps ($P_1$, $P_2$, $P_3$) in the secondary windings of the transformer (T).

5 Claims, 1 Drawing Sheet

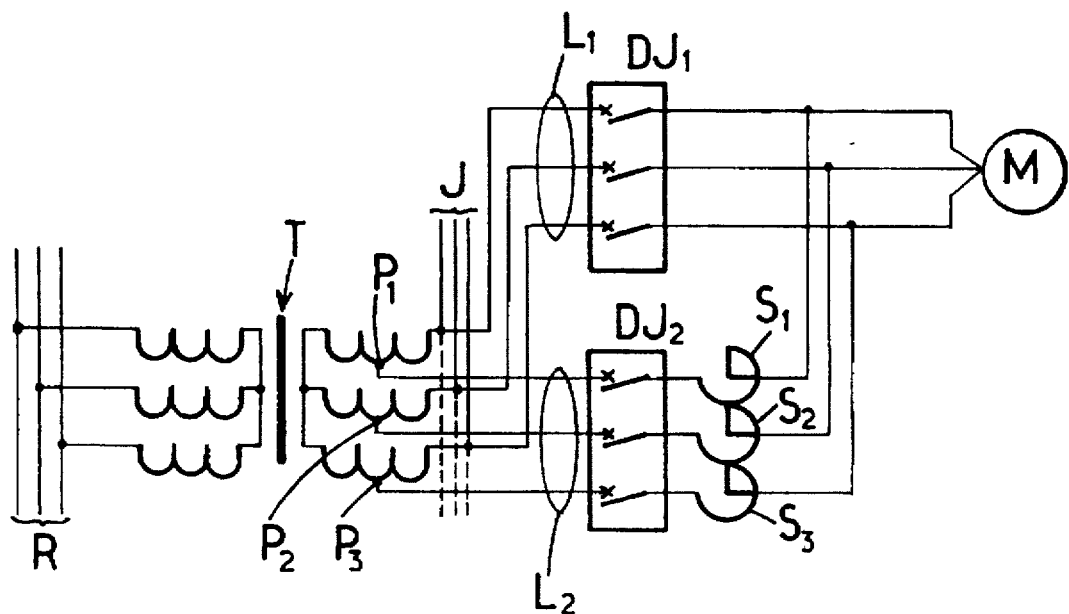
FIG.:1
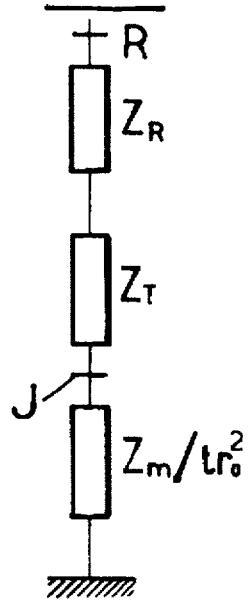
FIG.:2

PROCESS AND DEVICE FOR SUPPLYING A POLYPHASE ELECTRIC MOTOR DURING STARTUP

BACKGROUND OF THE INVENTION

1. Field of the Invention

The present invention relates to a procedure and to a device for supplying a polyphase electric motor during the startup period, across a transformer outputting on busbars which are connected to the motor and to other devices consuming electrical energy, said motor by itself consuming an active power greater than or equal to 20% of the available electric power.

2. Description of the Related Art

Currently, in industry, gas separation units are used to supply factories with various fluids such as compressed air, oxygen, argon, etc. . . . Such a factory ordinarily comprises a powerful motor fed with a three-phase current which drives an air compressor producing compressed air at a pressure of 8 bars, for example, the separation of the above-mentioned gases being carried out thereafter starting from this compressed air.

A principal transformer fed by the electrical network outputs to a busbar to which the motor is connected, as well as to other electrical power consuming devices installed in the factory in question. Because of its power, conventionally on the order of 20 MW, the driving motor of the compressor consumes a large part of the available power at the output of the transformer, greater than 20% of this power and often reaching 50%, or more.

It is understandable that the starting of such a motor causes problems, notably when the supply network exhibits a low short circuit power. In this hypothesis, the starting of the motor can reduce the voltage available on the busbars to such a level (for example less than 15% or less of the nominal voltage) that the functioning of the other electrical energy consuming devices is prevented or perturbed.

Otherwise, the time required to start the motor is a function, notably, of the sum of the inertias of the devices which it drives and the voltage available at its terminals. During startup, one can observe a strong demand for current during a period proportional to the sum of these inertias. This strong demand for current causes a release of heat in a coil system which is then adiabatic, release which must then be limited by reducing the starting time as much as possible, which is typically a value between 15 and 40 seconds.

To do this, two methods are currently used. According to the first technique, one regulates to a constant value the relationship between the voltage and the frequency of the current supplied to the motor during the starting phase, in such a manner that at any given time, the motor receives only that power which is necessary for startup, which is therefore carried out without heating up. Unfortunately, this method implicates the use of heavy and expensive power electronics.

According to the other method, the motor is paired with its own autotransformer, installed between the principal transformer and the motor. During the starting period, the motor is supplied with reduced voltage taken from the autotransformer, which avoids the perturbation in the functioning of the other electrical power consuming devices connected to the busbars, but increases the duration of the starting of the motor up to values which may be prohibitive, from the heating standpoint. Because an additional autotransformer is used, this solution has other disadvantages: it is expensive, it imposes a supplemental voltage drop (in the autotransformer) and finally, the power consumed during the startup is not the minimum startup power necessary.

SUMMARY OF THE INVENTION

It is therefore an object of the present invention to set forth a method of supplying a polyphase electric motor, during the startup period, which may be implemented in an inexpensive manner and which only causes that consumption of energy which is necessary to the starting of the motor.

The above and other objects of the present invention which will become apparent after a reading of the following description, can be attained with a method of supplying a polyphase electric motor across a transformer outputting on busbars onto which the motor and other electrical energy consuming devices are connected, said motor itself using an active power greater than or equal to 20% of the available electrical power, this method being remarkable in that, during at least a part of the startup period of the motor, the motor is supplied with reduced voltages taken from intermediate taps in the secondary windings of the transformer.

Thanks to this arrangement, the autotransformer traditionally used during the startup period is not necessary. According to an advantageous characteristic of the present invention, the transformation ratio of the transformer at each intermediate tap is chosen such that the voltage ratios $U_b/U_a$ and $U_m/U_a$ are both greater than predetermined values, respectively, $U_m$, $U_b$, and $U_a$ being, respectively, the voltage on the busbars during the startup period, the voltage on the terminals of the motor during the startup, and the voltage assigned from which the performance of the motor and the other electrical energy consuming devices are established. As will be seen later, in this manner, one can limit the voltage drop observed on the busbars in such a manner as to not disturb the functioning of the electrical energy consuming devices, all the while assuring the supply of the motor with a sufficient voltage to overcome the inertias acting on its output shaft in a sufficiently short time period to avoid all heating problems.

In certain extreme practical cases, the method according to the invention as described above can be improved even further.

This is, for example, the cases where the network has characteristics which are unsuited for the starting of the motor (this is the case of a low short circuit power or a small drop in the authorized voltage) or again when the machine driven by the motor is extremely power demanding (this is the case of driven motors having a high moment of inertia and/or a high resisting torque).

It is then particularly advantageous to provide at least an auxiliary pneumatic starting apparatus (constituted, for example, by a gas turbine), which provides energy to the motor directly in mechanical form, generated by the release of a gas.

This gas could, for example, be air, nitrogen, but equally also be any other suitable gas that an industrial installation could think of storing. The form in which this gas is stored is then of little importance, and may be in liquid or gaseous form.

This pneumatic auxiliary starting apparatus will then be put into operation alone during a first part of the starting phase, and therefore allows the speed of the motor to be brought to within a certain percentage X% of its nominal speed.

It should be understood by the above that during this first part of the starting phase, the motor is only supplied via the auxiliary apparatus.

During the remaining portion of the starting phase (therefore until nominal speed is attained), the motor is fed through a transformer according to the method according to the invention described above (reduced voltages taken at intermediate taps of the transformer).

According to one embodiment of the invention, during the remaining portion of the starting phase (second part), the motor is fed by the combined energy supply from the auxiliary apparatus and from the transformer, which means leaving the auxiliary apparatus in service during the entire duration of the starting phase.

As it will become clear to one of ordinary skill in the art, the auxiliary starting apparatus according to the invention may comprise many basic starting apparatus, according to the requisite performances.

The invention is also a supply device to implement the method according to the invention, comprising first supply conductors connecting motor to the terminals of the secondary windings of the transformer, this device being remarkable in that it comprises second conductors supplying the motor at intermediate taps on these windings and commutation means to selectively connect these intermediate taps to the motor by the second conductors and for disconnecting the first conductors during the startup period of the motor.

BRIEF DESCRIPTION OF THE DRAWINGS

Other characteristics and advantages of the present invention will be apparent from a reading of the description which follows and by examining the attached drawing in which:

FIG. 1 is a schematic of the supply device according to the present invention, and FIG. 2 is an equivalent electrical schematic of the device of FIG. 1, which is useful in the description of the method according to the invention.

DESCRIPTION OF THE PREFERRED EMBODIMENT

Reference is now made to FIG. 1 of the attached drawing which shows that the supply device according to the invention is fed with, for example, a three-phase current, from an electrical energy distribution network R. The primary windings of a principal transformer T are connected to the network R and the secondary windings of this transformer output current on busbars J onto which are connected various electrical energy consuming devices (not shown) such as one finds in factories or other industrial locations, and a motor M such as was described as preamble to the present description, to drive an air compressor, for example. As was described earlier, the present invention, more particularly, is useful when the motor M draws a large portion of the total power available to the installation, such as more than 20% of this power, for example, such as is the case when the motor drives an air compressor forming part of a gas separation unit used in industrial locations where other electrical power consuming devices are installed.

In steady state, the motor M is directly supplied by the busbars J, by a bus $L_1$ of first conductors. The commutation means $DJ_1$, constituted, for example, by a triple circuit breaker, are arranged on the conductors of the bus $L_1$. A direct startup of the motor with such a supply would present all of the disadvantages mentioned earlier as to the perturbation in the functioning of the other electrical energy consuming devices connected to the busbar J.

According to the present invention, one avoids having recourse to the costly means used in the prior art method to palliate these disadvantages, by supplying the motor M, during at least a part of the startup period, with reduced voltages taken at the intermediate taps ($P_1$, $P_2$, $P_3$) of the secondary windings of the principal transformer T itself. It is clear that this supply method is particularly economical as it only requires a bus of second conductors $L_2$ which allow to selectively connect, during the startup period, the motor M to said intermediate taps of the transformer T.

It is clear that the position of the intermediate taps ($P_1$, $P_2$, $P_3$) on the secondary windings of the transformer T must be chosen in such a manner that the startup of the motor fed by these taps does not cause the voltage to drop on the busbars lower than a value which would prevent the functioning of the other electrical energy consuming devices, which devices are designed to function normally at an assigned voltage $U_a$. Designating $U_b$ the voltage on the busbars during the startup period, this constraint can be stated by the relationship:

$$U_b/U_a > k$$

k being a constant.

If, as is currently the case, the electrical energy consuming devices are designed to function even in the presence of a supply voltage drop of a maximum of 15%, then one may choose k=0.85.

This constraint allows one to establish a first relationship which includes the transformer ratio $tr_0$ of the transformer T when it outputs on the intermediate taps $P_1$, $P_2$, $P_3$. Indeed, if one refers to the equivalent electrical circuit represented in FIG. 2, where $Z_R$, $Z_T$, $Z_m$, respectively, are the impedances of the network, of the transformer T and the motor during the startup phase, one can write:

$$U_b/U_a = (Z_m/tr_0^2)/(Z_r + Z_T + Z_m/tr_0^2) \qquad (1)$$

which imposes a first constraint on the value of $tr_0$ and thus on the position of the intermediate taps that the designer must determine.

Otherwise, to limit the duration of the startup time of the motor, and thus its warming up, the voltage $U_m$ which is applied thereto during the startup phase must be greater than a predetermined value, below which the time necessary to overcome the inertias braking its output shaft is considered to be too large. This constraint can be expressed by the relationship:

$$U_m/U_a = \frac{U_b \times tr_0}{U_a} > K' \qquad (2)$$

K' being a constant. For example one may choose K'=0.65.

It remains for the designer to determine, by successful trials, which values of $tr_0$ will satisfy both relationships 1 and 2 above at the same time. The designer may try, for example, values of $tr_0$ between the range 0.55 and 0.75 and, preferably, in the range between 0.6 and 0.65.

The starting of the motor using the method according to the invention is carried out as follows, in the case of a startup phase during which the motor is supplied exclusively by the transformer (without using any auxiliary apparatus). As represented in FIG. 1, the commutation means constituted by a triple circuit breaker $DJ_2$ are located on the conductors of the bus $L_2$. At startup, one closes this triple circuit breaker when the circuit breaker $DJ_1$ is open. A timing or a tachometer-like determination of the speed of the motor M then sequentially controls the opening of $DJ_2$ and the closing of $DJ_1$ to establish the steady state electrical supply of the motor. This supposes that the shaft driven by the motor M can withstand a limited dip in voltage, of, for example, 100 milliseconds.

If this is not the case, at the end of the startup phase, the circuit breaker $DJ_1$ closes before the circuit breaker $DJ_2$ opens. One can then place on the second conductors of the bus $L_2$ a bus of inductances $S_1$, $S_2$, $S_3$ to limit the short-circuit current in these conductors since then a part of the secondary windings outputs current in these inductances. The closing of $DJ_1$ controls the opening of $DJ_2$ and the acceleration of the motor continues until the nominal speed is attained.

It is now apparent that the present invention in fact delivers the advantages discussed earlier. It should be noted, moreover, that the invention does not use an autotransformer, and allows the short-circuit power of the network to be nonaffected, which is particularly advantageous when this short-circuit power is relatively small, because an insufficient short-circuit power can make the starting of the motor impossible. The invention permits, moreover, to ensure the starting of the motor with a minimum expenditure of energy.

In an installation where the short-circuit power is low, a conventional starting autotransformer must have characteristics close to that of the principal transformer to limit the short-circuit power drop in the network and the voltage drop caused by its impedance during the startup phase. The present invention allows one to save on the high cost of such an autotransformer.

We claim:

1. A device for supplying electrical energy to an electric polyphase motor comprising a transformer (T) outputting on busbars (J) onto which the motor (M) and other electrical energy consuming devices are connected; intermediate taps ($P_1$, $P_2$, $P_3$) on secondary windings of the transformer; first supply conductors ($L_1$) connecting the motor (M) to the terminals of the secondary windings of the transformer (T); second supply conductors ($L_2$) supplying the motor directly from said intermediate taps ($P_1$, $P_2$, $P_3$) and first and second commutation means ($DJ_1$, $DJ_2$) to selectively connect said intermediate taps to the motor (M) by the second conductors ($L_2$) and to disconnect the first conductors ($L_1$) during at least part of a startup phase of the motor.

2. Device according to claim 1, wherein said second commutation means ($DJ_2$) placed on the second conductors open after a closing of the first commutation means ($DJ_1$) placed on the first conductors, at an end of the startup phase of the motor.

3. Device according to claim 2, further comprising short-circuit current limiting inductances ($S_1$, $S_2$, $S_3$) disposed in series with the second commutation means ($DJ_2$) placed on the second conductors ($L_2$).

4. Device according to claim 1, further comprising at least an auxiliary pneumatic motor starting apparatus.

5. Device according to claim 4, wherein said device is a gas turbine.

* * * * *